United States Patent [19]

Sugata et al.

[11] Patent Number: 4,983,993

[45] Date of Patent: Jan. 8, 1991

[54] THERMAL RECORDING HEAD

[75] Inventors: Masao Sugata, Yokohama; Tatsuo Masaki, deceased, late of Yokohama, by Yoshiko Masaki, legal successor; Hirokazu Komuro; Shinichi Hirasawa, both of Hiratsuka; Yasuhiro Yano, Kawasaki, all of Japan

[73] Assignee: Canon Kabushiki Kaisha, Tokyo, Japan

[21] Appl. No.: 256,081

[22] Filed: Oct. 7, 1988

Related U.S. Application Data

[63] Continuation of Ser. No. 842,242, Mar. 21, 1986, abandoned.

[30] Foreign Application Priority Data

| | | | |
|---|---|---|---|
| Mar. 25, 1985 | [JP] | Japan | 60-58529 |
| Mar. 26, 1985 | [JP] | Japan | 60-59388 |
| Mar. 26, 1985 | [JP] | Japan | 60-59389 |
| Mar. 26, 1985 | [JP] | Japan | 60-59390 |
| Mar. 26, 1985 | [JP] | Japan | 60-59391 |
| Mar. 27, 1985 | [JP] | Japan | 60-60535 |
| Mar. 27, 1985 | [JP] | Japan | 60-60536 |
| Mar. 27, 1985 | [JP] | Japan | 60-60537 |
| Mar. 27, 1985 | [JP] | Japan | 60-60538 |
| Mar. 28, 1985 | [JP] | Japan | 60-62085 |

[51] Int. Cl.[5] .......... G01D 15/10; H05B 1/00; H01C 1/012; B32B 9/00

[52] U.S. Cl. .......... 346/76 PH; 219/216; 338/308; 428/408

[58] Field of Search .......... 346/76 PH; 219/216; 338/308; 428/408

[56] References Cited

U.S. PATENT DOCUMENTS

| | | | |
|---|---|---|---|
| 3,301,707 | 1/1967 | Loeb et al. | 117/227 |
| 3,604,970 | 9/1971 | Culbertson et al. | 313/107 |
| 3,639,165 | 2/1972 | Rairden | 428/433 |
| 3,645,783 | 2/1972 | Rupert et al. | 428/209 |
| 4,036,786 | 7/1977 | Tiedeman | 252/511 |
| 4,060,660 | 11/1977 | Carlson et al. | 428/408 |
| 4,172,718 | 10/1979 | Menzel | 75/174 |
| 4,296,309 | 10/1981 | Shinmi et al. | 219/216 |
| 4,361,638 | 11/1982 | Higashi et al. | 430/58 |
| 4,400,410 | 8/1983 | Green et al. | 427/39 |
| 4,414,274 | 11/1983 | Hieber | 428/336 |
| 4,436,797 | 3/1984 | Brady et al. | 430/5 |
| 4,522,663 | 6/1985 | Ovshinsky et al. | 148/403 |
| 4,567,493 | 1/1986 | Ikeda et al. | 346/140 R |
| 4,568,626 | 2/1986 | Ogawa | 430/128 |
| 4,585,704 | 4/1986 | Hirai et. al. | 428/446 |
| 4,597,844 | 7/1986 | Hiraki et al. | 204/192 C |
| 4,629,514 | 12/1986 | Suda | 148/1.5 |

FOREIGN PATENT DOCUMENTS

| | | |
|---|---|---|
| 0071082 | 2/1983 | European Pat. Off. . |
| 3411702 | 10/1984 | Fed. Rep. of Germany . |
| 3316182 | 11/1984 | Fed. Rep. of Germany . |
| 3041420 | 1/1985 | Fed. Rep. of Germany . |
| 56-49521 | 5/1981 | Japan . |
| 58-42472 | 7/1983 | Japan . |
| 58-42473 | 10/1983 | Japan . |
| 1410876 | 10/1975 | United Kingdom . |
| 1582231 | 1/1981 | United Kingdom . |
| 2083841 | 3/1982 | United Kingdom . |
| 2109012 | 5/1983 | United Kingdom . |

*Primary Examiner*—Bruce A. Reynolds
*Assistant Examiner*—Gerald E. Preston
*Attorney, Agent, or Firm*—Fitzpatrick, Cella, Harper & Scinto

[57] ABSTRACT

A thermal recording head comprises at least one set of a heat-generating resistance layer and at least one pair of electrodes connected electrically to said heat-generating resistance layer formed on a substrate, wherein said heat-generating resistance layer comprises an amorphous material containing halogen atoms and hydrogen atoms in a matrix of carbon atoms.

53 Claims, 4 Drawing Sheets

THERMAL RECORDING HEAD

This application is a continuation of application Ser. No. 842,242, filed Mar. 21, 1986, now abandoned

BACKGROUND OF THE INVENTION

1. Field of the Invention

This invention relates to a thermal recording head used in a recording system which performs recording by utilization of heat energy.

2. Related Background Art

In the prior art, the recording system which performs recording by utilization of heat energy has the advantage of being very low in noise during recording due to the non-impact mechanism, and is also attracting attention increasingly in recent years because it enables color printing.

In such a recording system, recording information is transmitted to a thermal recording head, namely an electricity-to-heat converting device, in the form of electrical signals. As the electricity-to-heat converting device, there is employed a device comprising a heat-generating resistance layer formed on a substrate and at least one pair of electrodes connected to said heat-generating resistance layer. Here, the substrate means a material for carrying the heat-generating resistance layer, and said substrate may comprise suitable layers formed on a mere support, if desired. Since the thermal recording head is generally of relatively small size, the heat-generating resistance layer used therefor is of the thin film type, the thick film type or the semiconductor type. Particularly, the thin film type is preferable as the constituent of the thermal recording head, because power consumption is small and also thermal response is relatively good, and thus it is increasingly applied.

And, the performances demanded for such a heat-generating resistance layer of the thermal recording head are good response of heat generation to a given electrical signal, good thermal conductivity, good heat resistance to heat generation of itself and various durabilities (e.g. durability against heat history). Further, when the thermal recording head is used under pressure contact with a heat-sensitive paper or a thermal transfer ink ribbon, the coefficient of friction with those is required to be small.

Whereas, in the heat-generating resistance layer of the thermal recording head used in the prior art, the above performances are not always satisfactory and further improvement in the characteristics has been desired.

Also, in the thermal recording head of the prior art, it has been the practice to provide an abrasion-resistant layer on the surface of the heat-generating resistance layer, but such has often resulted in the sacrifice of the thermal response.

Further, in the thermal recording head of the prior art, when recording is effected on such a recording medium as a paper with coarse surface, etc., the abrasion is rapid because the head is required to strongly press in to contact with the recording medium in order to perform recording in complete dot shapes, and therefore it has been desired to improve further its performance.

SUMMARY OF THE INVENTION

In view of the prior art as described above, an object of the present invention is to provide a thermal recording head having a heat-generating resistance layer improved in heat response.

Another object of the present invention is to provide a thermal recording head having a heat-generating resistance layer improved in thermal conductivity.

Still another object of the present invention is to provide a thermal recording head having a heat-generating resistance layer improved in heat resistance.

Still another object of the present invention is to provide a thermal recording head having a heat-generating resistance layer improved in durability.

It is also another object of the present invention to provide a thermal recording head having a heat-generating resistance layer improved in abrasion resistance.

A further object of the present invention is to provide a thermal recording head having a heat-generating resistance layer with a small coefficient of friction.

Still another object of the present invention is to provided a thermal head having a heat-generating resistance layer enriched in mechanical strength, flexibility and chemical resistance.

Further, another object of the present invention is to provide a thermal recording head having a heat-generating resistance layer enriched in controllability of resistance value.

According to the present invention, there is provided a thermal recording head comprising a set of a heat-generating resistance layer and at least one pair of electrodes connected electrically to said heat-generating resistance layer formed on a substrate, wherein said heat-generating resistance layer comprises an amorphous material containing halogen atoms and hydrogen atoms in a matrix of carbon atoms.

DESCRIPTION OF THE PREFERRED EMBODIMENT

Figure 1:
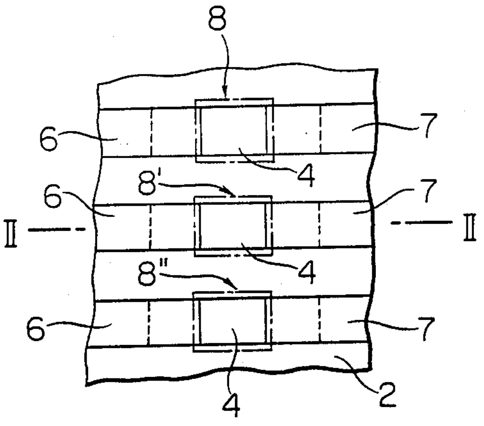
FIG. 1 is a partial plan view of the thermal recording head of the present invention and FIG. 2 is a sectional view taken along the line II—II in FIG. 1.
Figure 2:
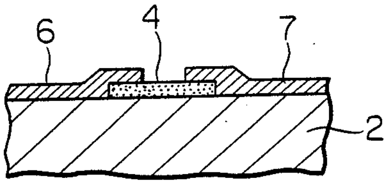

FIG. 1 is a partial plan view of the thermal recording head of the present invention and FIG. 2 is a sectional view taken along the line II—II in FIG. 1.

In these figures, 2 is a substrate and 4 is a heat-generating resistance layer, and 6 and 7 are a pair of electrodes. As shown in FIG. 1, a plurality of sets of the heat-generating resistance layer 4 and a pair of the electrodes 6 and 7 connected to said heat-generating resistance layer are provided in combination, whereby the dot-shaped effective heat-generating portions 8, 8', 8'', . . . are arranged linearly at a predetermined interval. And, said thermal recording head is pressure contacted on the heat-generating resistance layer 4 side against a heat-sensitive paper or a heat-transfer ink ribbon during usage, to be migrated in the direction of II—II relatively to said heat-sensitive paper of heat-transfer ink ribbon, while electrical signals which are recording informations, are applied through the respective electrodes 6 and 7 on the heat-resistance layer 4 constituting the respective heat-generating portions 8, 8′, 8″. . . , whereby heat-sensitive system or heat-transfer system recording is effected by the heat generated.

The material for the substrate 2 is not particularly limited in the present invention, but it is practically preferable to use a material which is good in adhesion to the resistance layer 4 and electrodes 6, 7 to be formed on its surface, and also good in resistance to the heat during formation of said resistance layer and electrodes 6, 7, and to the heat generated from the heat-generating resistance layer 4 during usage. Also, the substrate 2 should preferably have an electrical resistance greater than that of the heat-generating resistance layer 4 formed on its surface. Further, the substrate 2 is selected from materials which can give necessary and sufficient heat energy to the recording medium side and have thermal conductivity which does not lessen the response to electrical input.

Examples of the substrate 2 to be used in the present invention may include those comprising inorganic materials such as glass, ceramics, silicon, etc. and organic materials such as polyamide resins, polyimide resins, etc.

In the present invention, the heat-generating resistance layer 4 comprises an amorphous material containing halogen atoms and hydrogen atoms in a matrix of carbon atoms. As halogen atoms, F, Cl, Br, I and the like can be utilized, and these may be used either singularly or in combination. As halogen atoms, particularly F and Cl are preferred, and above all F is preferred.

The content of halogen atoms in the heat-generating resistance layer 4 may be suitably selected depending on the purpose of use of the resistor so that desired characteristics may be obtained, and it is preferably 0.0001 to 30 atomic %, more preferably 0.0005 to 20 atomic %, optimally 0.001 to 10 atomic %.

The content of hydrogen atoms in the heat-generating resistance layer 4 may be suitably selected depending on the purpose of use of the resistor so that desired characteristics may be obtained, and it is preferably 0.0001 to 30 atomic %, more preferably 0.0005 to 20 atomic %, optimally 0.001 to 10 atomic %.

The sum of the content of halogen atoms and hydrogen atoms in the heat-generating resistance layer 4 may be suitably selected depending on the purpose of use of the resistor so that desired characteristics may be obtained, and it is preferably 0.0001 to 40 atomic %, more preferably 0.0005 to 30 atomic %, optimally 0.001 to 20 atomic %.

The heat-generating resistance layer 4 comprising an amorphous material containing halogen atoms and hydrogen atoms in a matrix of carbon atoms (hereinafter sometimes abbreviated as "a-C:(X,H)"; here X represents halogen atoms) in the heat-generating resistor of the present invention can be formed according to a plasma CVD method such as the glow discharge method or a vacuum deposition method such as the sputtering method.

For example, for formation of the resistance layer 4 comprising a-C:(X,H) according to the glow discharge method, the basic process may comprise arranging the substrate 2 in a deposition chamber under reduced pressure, introducing a starting gas for C supply capable of supplying carbon atoms (C), a starting gas for X supply capable of supplying halogen atoms (X) and a starting gas for H supply capable of supplying hydrogen atoms (H) into said deposition chamber and exciting glow discharging by use of high frequency or microwave in said deposition chamber thereby to form a layer comprising a-C:(X,H) on the surface of the substrate 2.

On the other hand, for formation of the resistance layer 4 comprising a-C:(X,H) according to the sputtering method, the basic process may comprise arranging the substrate 2 in a deposition chamber under reduced pressure and introducing a starting gas for X supply and a starting gas for H supply into the deposition chamber in carrying out sputtering of a target constituted of C in an atomsphere of an inert gas such as Ar, He or the like or a gas mixture based on these gases in said deposition chamber.

By use of the heat-generating resistance layer thus formed, there is provided a thermal recording head which is markedly excellent in thermal response, thermal conductivity, heat resistance and/or durability. Also, the heat-generating resistance layer of the thermal head of the present invention can be formed with ease. Further, while a thermal recording head having an exellent heat-generating resistance layer with good abrasion resistance and/or small coefficient of friction according to the present invention, for the purpose of improving mechanical strenght of the heat-generating resistance layer 4, silicon atoms may also be contained. Further, for the purpose of improving flexibility of the heat-generating resistance layer 4, germanium atoms may also be contained. Thus, for the purpose of improving mechanical strength, chemical resistance and flexibility of the heat-generating resistance layer 4, silicon atoms and germanium atoms may also be contained in the above resistance layer 4.

On the other hand, for improvement of controllability of the resistance value of the resistance layer 4, a substance for controlling electroconductivity can be further contained.

For the substance for controlling electroconductivity, there may be utilized so called impurities in the field of semiconductors, namely p-type impurities giving p-type conduction characteristics to carbon and n-type impurities giving n-type conduction characteristics to carbon. As the p-type impurities, the atoms belonging to group III of the periodic table such as, B, Al, Ga, In and Tl may be included, particularly B and Ga. As the n-type impurities, the atoms belonging to group V of the periodic table such as P, As, Sb and Bi may be included, particulary P and As. These can be used either singularly or in combination.

The content of silicon atoms in the heat-generating resistance layer 4 may be selected suitably so that desired characteristics may be obtained, and it may preferably be 0.0001 to 40 atomic %, more preferably 0.0005 to 20 atomic %, optimally 0.001 to 10 atomic %.

The content of germanuim atoms in the heat-generating resistance layer 4 may be selected suitabaly so that desired characteristics may be obtained, and it may preferably be 0.0001 to 40 atomic %, more preferably 0.0005 to 20 atomic %, optimally 0.001 to 10 atomic %.

The sum of the content of silicon atoms and/or germanium atoms, the content of halogen atoms and the content of hydrogen atoms in the heat-generating resistance layer 4 may be selected suitably so that desired characteristics may be obtained, and it may preferably be 0.0001 to 40 atomic %, more preferably 0.0005 to 30 atomic %, optimally 0.001 to 20 atomic %.

The content of the substance for controlling electroconductivity in the functional thin film 4 may be selected suitably so as to obtain desirable characteristics, and it may preferably be 0.01 to 50000 atomic ppm, more preferably 0.5 to 10000 atomic ppm, optimally 1 to 5000 atomic ppm.

Even when substances selected from silicon atoms, germanium atoms and the substances for controlling electroconductivity are further contained in a-C:(X,H), the content of halogen atoms, the content of hydrogen atoms, and the sum of halogen atoms and hydrogen atoms may be within the ranges as specified above.

The heat-generating resistance layer 4 comprising an amorphous material containing silicon atoms, halogen atoms and hydrogen atoms in a matrix of carbon atoms (hereinafter sometimes aabbreviated as "a-C:Si(X,H)"; here X represents a halogen atom) can be also formed according to a plasma CVD method such as the glow discharge method or a vacuum deposition method such as the sputtering method, similarly as described above in the case of formation of a-C(X,H).

For example, for formation of a resistance layer 4 comprising a-C:Si:(X,H) according to the glow discharge method, the process is basically the same for formation of a-C:(X,H) according to the glow discharge method, and it can be formed by introducing further a starting gas for Si supply capable of supplying silicon atoms (Si) as the starting material. On the other hand, for formation of a-C:Si:(X,H) according to the sputtering method, it can be formed similarly by introducing a starting material for Si supply into the starting gases used for formation of a-C:(X,H).

The heat-generating resistance layer 4 comprising an amorphous material containing germanium atoms, halogen atoms and hydrogen atoms in a matrix of carbon atoms, (hereinafter sometimes abbreviated as "ai-C:Ge:(X,H)"; here X represents a halogen atom) in the heat-generating resistor of the present invention can be formed also according to a plasma CVD method such as the glow discharge method or a vacuum deposition method such as the sputtering method, similarly as described above in the case of formation of a-C:(X,H).

For example, for formation of a resistance layer 4 comprising a-C:Ge:(X,H) according to the glow discharge method, the process is basically the same for formation of a-C:Si:(X,H) except for using the starting gas for Ge supply capable of supplying germanium atoms (Ge) in place of the starting gas for Si supply. On the other hand, for formation of a-C:Si(X,H) according to the sputtering method, it can be formed similarly by changing the starting gas for Si supply to the starting gas for Ge supply.

The heat-generating resistance layer 4 comprising an amorphous material containing silicon atoms, germanium atoms, halogen atoms and hydrogen atoms, in a matrix of carbon atoms (hereinafter sometimes abbreviated as "a-C:Si:Ge:(X,H)"; here X represents a halogen atom) can be formed also according to a plasma CVD method such as the glow discharge method or a vacuum deposition method such as the sputtering method, similarly as described above in the case of formation of a-C:(X,H).

For example, for formation of a thin film comprising a-C:Si:Ge:(X,H), it can be formed by introducing further a starting gas for Ge supply in addition to the starting gases for formation of a-C:Si:(X,H) as described above, and otherwise performing the same operations.

The heat-generating resistance layer 4 comprising an amorphous material containing halogen atoms, hydrogen atoms and a substance for controlling electroconductivity in a matrix of carbon atoms (hereinafter sometimes abbreviated as "a-C:(X,H)(p,n)", here (p,n) represents a substance for controlling electroconductivity), it can be formed according to a plasma CVD method such as the glow discharge method or a vacuum deposition method such as the sputtering method, also in the same manner as described above for formation of the respective resistance layers.

In this case, in addition to the starting gases employed during formation of a-C:(X,H) as described above, a starting gas for supplying a substance for controlling electroconductivity can be further introduced to form similarly the resistance layer. Also, by introducing further a starting gas for supplying a substance for controlling electroconductivity during formation of a-C:Si:(X,H), a-C:Ge:(X,H) or a-C:Si:Ge(X,H), it is possible to form respective resistance layers of a-C:Si:(X,H)(p,n), a-C:Ge:(X,H)(p,n) or a-C:Si:-Ge(X,H)(p,n).

In the present invention, for making various characteristics such as heat accumulation dissipation, adhesion between the substrate and the resistance layer more desirable, the substance selected from halogen atoms, hydrogen atoms, silicon atoms, germanium atoms and substances for controlling electroconductivity may be distributed nonuniformly in the film thickness direction. That is, the distribution of the substance selected from halogen atoms, hydrogen atoms, silicon atoms, germanium atoms and substances for controlling electroconductivity in the heat-generating resistance layer 4 may be non-uniform in the layer thickness direction. The content of the substance selected from halogen atoms, hydrogen atoms, silicon atoms, germanium atoms and the substance for controlling electroconductivity in the functional thin film 4 may be changed in a manner such that it is gradually increased from the substrate 2 side toward the surface side or, on the contrary, the content is reduced. Further, the content of the substance selected from halogen atoms, hydrogen atoms, silicon atoms and the substance for controlling electroconductivity in the resistance layer 4 may be changed in a manner such that it has peak or bottom values. The change in content of the substance selected from halogen atoms, hydrogen atoms, silicon atoms, germanium atoms and the substance for controlling electroconductivity in the heat-generating resistance layer 4 in the film thickness direction may be selected optimally so that desired characteristics may be obtained.

FIGS. 6 through 11 show examples of the changes in content of the substance selected from halogen atoms, hydrogen atoms, silicon atoms, germanium atoms and the substance for controlling electroconductivity in the heat-generating resistance layer 4 with respect to the film thickness direction. In these Figures, the ordinate represents the distance T from the interface with the substrate 2 in the film thickness direction, and t represents the film thickness of the heat-generating resistance layer 4. On the other hand, the abscissa represents the content C of the substance selected from halogen atoms, hydrogen atoms, silicon atoms, germanium atoms and the substance for controlling electroconductivity. In respective Figures, the scales on the ordinate T and the abscissa C are not necessarily identical, but they are modified so as to exhibit the characteristics of the respective Figures. Accordingly, in practical application, various distributions based on the difference in specific numerical values are used for respective Figures. Also, the manner of distribution is not required to be common to respective atoms, as a matter of course.

Also in the case of forming a heat-generating resistance layer with the content of the substance selected from silicon atoms, germanium atoms, halogen atoms, hydrogen atoms and a substance for controlling electroconductivity distributed nonuniformly, it is possible to use the vacuum deposition method as described above. In this case, nonuniform distribution of the above substance can be accomplished by varying the discharging power or the amount of the starting gas introduced as desired.

In the above processes, as the starting gas for C supply, the starting gas for Si supply, the starting gas for Ge supply, the starting gas for X supply, the starting gas for H supply, and the starting gas for supplying a substance for controlling electroconductivity, substances gaseous under normal temperature and normal pressure or otherwise those gasifiable under reduced pressure can be used.

The starting material for C supply may include, for example, saturated hydrocarbons having 1 to 5 carbon atoms, ethylenic hydrocarbons having 2 to 5 carbon atoms, acetylenic hydrocarbons having 2 to 4 carbon atoms, aromatic hydrocarbons, specifically saturated hydrocarbons such as methane ($CH_4$), ethane ($C_2H_6$), propane ($C_3H_8$), n-butane (n-$C_4H_{10}$), pentane ($C_5H_{12}$); ethylenic hydrocarbons such as ethylene ($C_2H_4$), propylene ($C_3H_6$), 1-butene ($C_4H_8$), 2-butene ($C_4H_8$), isobutylene ($C_4H_8$), pentene ($C_5H_{10}$); acetylenic hydrocarbons such as acetylene ($C_2H_2$), methylacetylene ($C_3H_4$), butyne ($C_4H_6$); aromatic hydrocarbons such as benzene or the like.

The starting gas for Si supply may include, for example, hydrogenated silicon (silanes) such as $SiH_4$, $Si_2H_6$, $Si_3H_8$, $Si_4H_{10}$ and the like; halogenated silicon (silane derivatives substituted with halogen atoms) such as $SiF_4$, $(SiF_2)_5$, $(SiF_2)_6$, $(SiF_2)_4$, $Si_2F_6$, $Si_3F_8$, $SiHF_3$, $SiH_2F_2$, $SiCl_4$, $(SiCl_2)_5$, $SiBr_4$, $(SiBr_2)_5$, $Si_2Cl_6$, $SiCl_3F_3$ and the like. The starting gas for Ge supply may include, for example, hydrogenated germanium such as $GeH_4$, $Ge_2H_6$, $Ge_3H_8$, $Ge_4H_{10}$, $Ge_5H_{12}$, $Ge_6H_{14}$, $Ge_7H_{16}$, $Ge_8H_{18}$, $Ge_9H_{20}$ and the like; halogenated germanium (hydrogenated germanium derivatives substitued with halogen atoms) such as $GeF_4$, $(GeF_2)_5$, $(GeF_2)_6$, $(GeF_2)_4$, $Ge_2F_6$, $Ge_3F_8$, $GeHF_3$, $GeH_2F_2$, $GeCl_4$, $(GeCl_2)_5$, $GeBr_4$, $(GeBr_2)_5$, $Ge_2Cl_6$, $Ge_2Cl_3F_3$ and the like.

The starting material for X supply may include, for example, halogens, halides, interhalogen compounds, halo-substituted hydrocarbon derivatives, specifically halogens such as $F_2$, $Cl_2$, $Br_2$, $I_2$; halides such as HF, HCl, HBr, HI; interhalogen compounds such as BrF, ClF, $ClF_3$, $BrF_5$, $BrF_3$, $IF_7$, ICl, IBr; halosubstituted hydrocarbon derivatives such as $CF_4$, $CHF_3$, $CH_2F_2$, $CH_3F$, $CCl_4$, $CHCl_3$, $CH_2Cl_2$, $CH_3Cl$, $CBr_4$, $CHBr_3$, $CH_2Br_2$, $CH_3Br$, $CI_4$, $CHI_3$, $CH_2I_2$, $CH_3I$; and the like. The starting gas for H supply may include, for example, hydrogen gas and hydrocarbons such as saturated hydrocarbons, ethylenic hydrocarbons, acetylenic hydrocarbons, aromatic hydrocarbons, etc. which are also the above starting materials for C supply.

The starting material for supplying a substance for controlling electroconductivity may include the exemplary compounds as shown below.

Examples of the starting material for supplying the group III atoms are boron hydrides such as $B_2H_6$, $B_4H_{10}$, $B_5H_9$, $B_5H_{11}$, $B_6H_{10}$, $B_6H_{12}$, $B_6H_{14}$ or the like and boron halides such as $BF_3$, $BCl_3$, $BBr_3$ or the like for supplying boron atoms, and further $AlCl_3$, $GaCl_3$, $Ga(CH_3)_3$, $InCl_3$, $TlCl_3$ and others for supplying other atoms.

Examples of the starting material for supplying the group V atoms are phosphorus hydrides such as $PH_3$, $P_2H_4$ or the like and phosphorus halides such as $PH_4I$, $PF_3$, $PF_5$, $PCl_3$, $PCl_5$, $PBr_3$, $PBr_5$, $PI_3$ or the like, and further $AsH_3$, $AsF_3$, $AsCl_3$, $AsBr_3$, $AsF_5$, $SbH_3$, $SbF_3$, $SbF_5$, $SbCl_3$, $SbCl_5$, $BiH_3$, $BiCl_3$, $BiBr_3$ and others for supplying other atoms.

These starting materials may be used either singularly or in combination.

In the process for forming a heat-generating resistance layer as described above, for controlling the amount of silicon atoms, the amount of germanium atoms, the amount of halogen atoms, the amount of hydrogen atoms, the amount of a substance for controlling electroconductivity contained and the characteristics of the resistance layer 4, the substrate temperature, the amounts of the starting gases supplied, the discharging power and the pressure in the deposition chamber are adequately set.

The substrate temperature may preferably be 20° to 1500° C., more preferably 30° to 1200° C., optimally 50° to 1100° C.

The amounts of the starting gases supplied are determined suitably depending on the desired performances of the heat-generating resistance layer and the desired film forming speed.

The discharging power may preferably be 0.001 to 20 W/cm$^2$, more preferably 0.01 to 15 W/cm$^2$, optimally 0.05 to 10 W/cm$^2$.

The pressure in the deposition chamber may preferably be $10^{-4}$ to 10 Torr, more preferably $10^{-2}$ to 5 Torr.

The resistance layer of the thermal recording head of the present invention obtained by use of the process for forming heat-generating resistance layer as described above has characteristics approximate to diamond. That is, for example, it has properties of a Vickers hardness of 1800 to 5000, a thermal conductivity of 0.3 to 2 cal/cm-.sec.deg, a resistivity of $10^5$ to $10^{11}$ ohm.cm., a coefficient of thermal expansion of $2\times10^{-5}$ to $10^{-6}$/° C., a coefficient of friction of 0.15 to 0.25 and a density of 1.5 to 3.0. Also, since it contains halogen atoms and hydrogen atoms, film formation can be done with ease.

In the thermal recording head of the present invention, since abrasion resistance of the resistance layer 4 is particularly good, said resistance layer can be made very thin and no special abrasion-resistant layer is required, whereby a thermal recording head having very good heat response can be obtained.

However, it is of course possible to attach a layer having protection and other functions suitably on the heat-generating resistance layer of the thermal recording head. For example, by provision of a protective layer, durability can be further improved.

Figure 3:
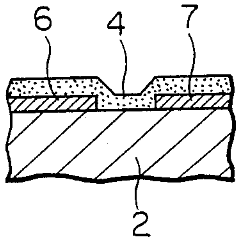
FIG. 3 and FIG. 4 are partial sectional views of the thermal recording head of the present invention.

In the above embodiment, there is shown an example in which a heat-generating resistance layer and an electrode are provided on the substrate in this order, but it is also possible to provide an electrode and a heat-generating resistance layer in this order on the substrate in the thermal recording head of the present invention. FIG. 3 shows a partial sectional view of such a thermal recording head. In this Figure, 2 is a substrate, 4 is a heat-generating resistance layer and 6, 7 are a pair of electrodes. In this case, since a heat-generating resistance more enriched in durability is located on the recording medium side, a very excellent thermal recording head can be provided without providing specially an abrasion-resistant layer.

Figure 4:
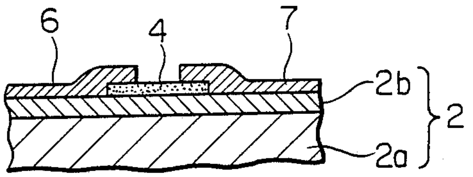

Having been described above with reference to a single substrate 2 in the above embodiment, the substrate 2 in the present invention may also be a composite material. An example of such an embodiment is shown in FIG. 4. That is, the substrate 2 comprises a composite material of a base portion 2a and a surface layer 2b, and the substrate material described with reference to the above FIG. 1, for example, can be used as the base portion 2a, while a material having good adhesiveness with the heat-generating resistance layer 4 to be formed thereon can be used as the surface layer 2b. The surface layer of 2b may be constituted of, for example, an amorphous material made of a matrix of carbon atoms or an oxide conventionally known in the art. Such a surface layer 2b can be obtained by use of a suitable starting material by depositing it according to the process similar to the above-described process for forming heat-generating resistance layer. Also, the surface layer 2b may be a glaze layer of a conventional glassy material.

The electrodes 6 and 7 in the thermal recording head of the present invention may be made of any material having electroconductivity for example, a metal such as Au, Cu, Al, Ag, Ni, etc.

Next, a schematic explanation of the process for producing the thermal recording head of the present invention is given.

Figure 5:
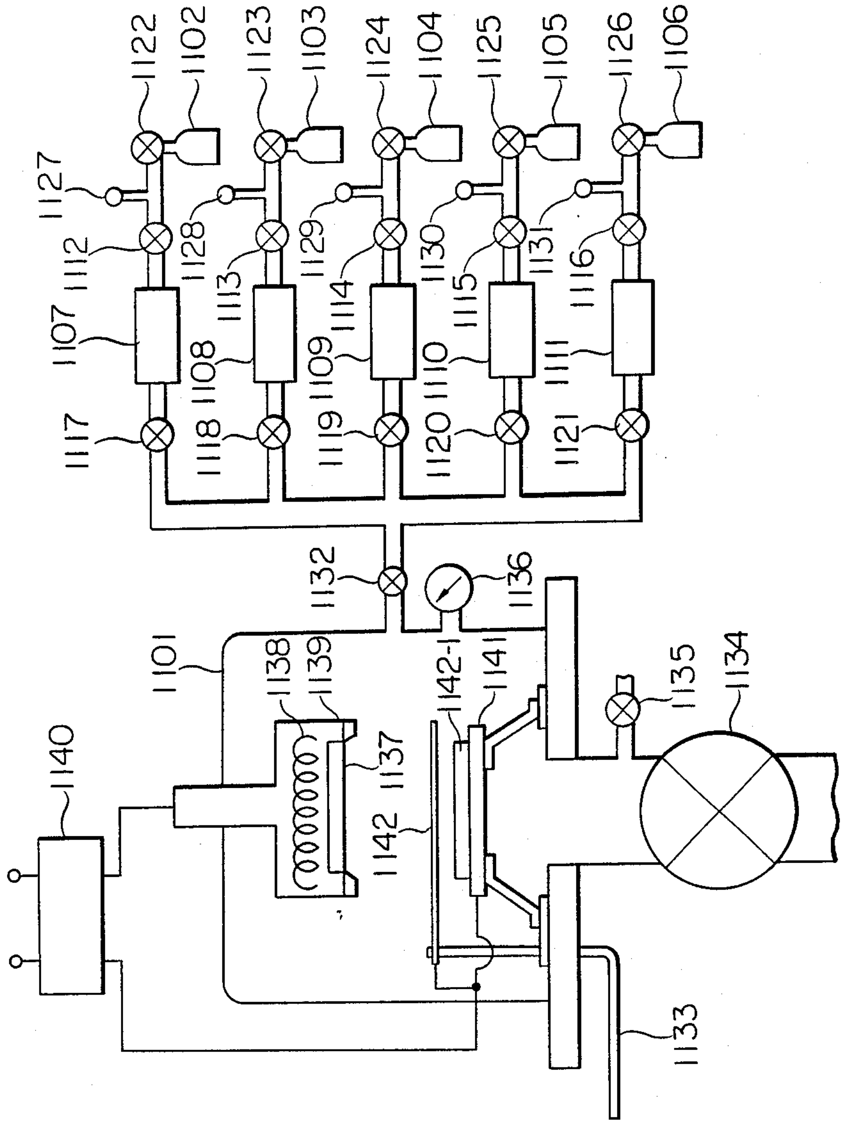
FIG. 5 is an illustration of the device to be used for preparation of the thermal recording head of the present invention.
Figure 6:
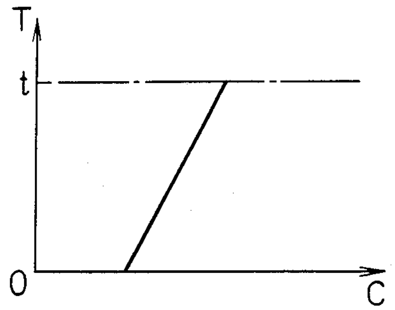
FIG. 6 to FIG. 11 are graphs showing distribution of the content of a substance selected from halogen atoms, hydrogen atoms, silicon atoms, germanium atoms and substances for controlling electroconductivity.
Figure 7:
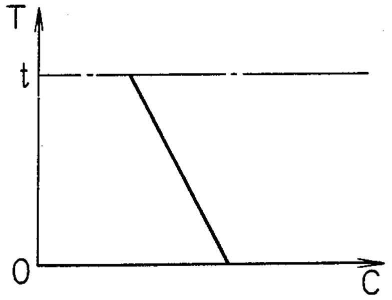
Figure 8:
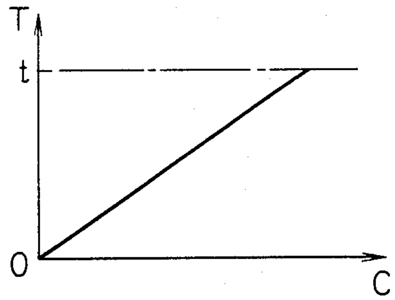
Figure 9:
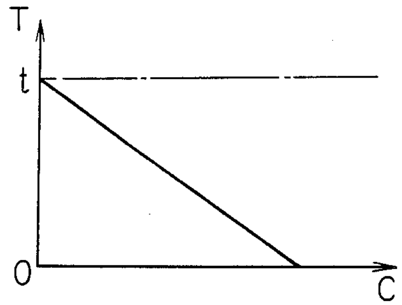
Figure 10:
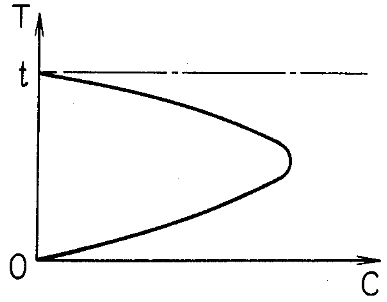
Figure 11:
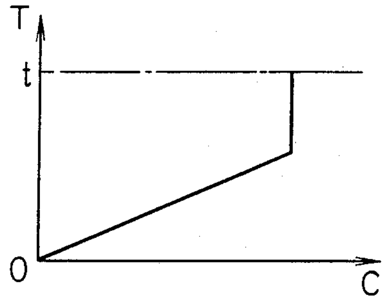

FIG. 5 is an illustration showing an example of the device to be used during formation of a heat-generating resistance layer on the substrate surface. 1101 is a deposition chamber, 1102 to 1106 are gas bombs, 1107 to 1111 are mass flow controllers, 1112 to 1116 are inflow valves, 1117 to 1121 are outflow valves, 1122 to 1126 are valves for gas bombs, 1127 to 1131 are outlet pressure gages, 1132 is an auxiliary valve, 1133 is a lever, 1134 is a main valve, 1135 is a leak valve, 1136 is a vacuum gages, 1137 is a substrate material of the thermal head to be prepared. 1138 is a heater, 1139 is a substrate supporting member, 1140 is a high voltage power source, 1141 is an electrode, and 1142 is a shutter. 1142-1 a target which is mounted on the electrode 1141 in carrying out the sputtering method.

In the case of forming a-C:(X,H), for example, 1102 is hermetically filled with $CF_4$ gas (purity: 99.9% or higher) diluted with Ar gas, 1103 is hermetically filled with $C_2F_6$ gas (purity: 99.9% or higher) diluted with Ar gas, 1104 hermetically filled with $H_2$ gas (purity: 99.9% or higher), and 1105 hermetically filled with $CHF_3$ gas (purity: 99.9% or higher) diluted with Ar gas. Prior to inflow of the gases in these bombs into the deposition chamber 1101, while confirming that the valves 1122 to 1126 for the respective gas, bombs 1102 to 1106 and the leak valve 1135 are closed, and also confirming that the inflow valves 1112 to 1116, the output valves 1117 to 1121 and the auxiliary valve 1132 are opened, at first the main valve 1134 is opened to evacuate internally the deposition chamber 1101 and the gas pipelines. Next, when the reading on the vacuum gages 1136 becomes about $1.5\times10^{-6}$ Torr, the auxiliary valve 1132, the inflow valves 1112 to 1116 and the outflow valves 1117 to 1121 are closed. Then, the valves of the gas pipelines connected to the bomb of the gas to be introduced into the deposition chamber 1101 is opened to introduce the desired gas into the deposition chamber 1101.

Next, an example of the procedure for preparing the resistance layer of the thermal recording head of the present invention according to the glow discharge method by use of the above device is described. By opening the valve 1122, $CF_4$/Ar gas is permitted to flow out from the gas bomb 1102, while $H_2$ gas to flow out from the gas bomb 1104 by opening the valve 1124, and then with adjustment of the outlet pressure gages 1127 and 1129 to 1 $Kg/cm^2$, to flow into the mass flow controllers 1107 and 1109 by opening gradually the inflow valves 1112 and 1114. Subsequently, by opening gradually the outflow valves 1117 and 1119 and the auxiliary valve 1132, $CF_4$/Ar gas and $H_2$ gas are introduced into the deposition chamber 1101. During this operation, the mass flow controllers 1107 and 1109 are adjusted so that the ratio of the flow rate of $CF_4$/Ar gas to the flow rate of $H_2$ gas may become a desired value, and also the opening of the main valve 1134 is adjusted while watching the reading on the vacuum gages 1136 so that the pressure in the deposition chamber 1101 may become a desired value. And, after the substrate 1137 supported by the supporting member 1139 in the deposition chamber 1101 is heated by the heater 1138 to a desired temperature, the shutter 1142 is opened and glow discharging is excited in the deposition chamber 1101.

When the contents of halogen atoms and/or hydrogen atoms are distributed nonuniformly in the layer thickness direction in the case of forming a-C:(X,H) by use of the glow discharge method, the operations of changing the openings of the outflow valves 1117 and 1119 may be performed manually or by means of an externally driven motor, etc. to change the flow rate of $CF_4$/Ar gas and/or the flow rate of $H_2$ gas with lapse of time following the change rate curve previously designed, thereby changing the content of F atoms or H atoms in the resistance layer 4 in the film thickness direction.

Next, an example of the procedure when preparing the resistance layer of the thermal recording head of the present invention according to the sputtering method by use of the above device. On the electrode 1141 on which high voltage is to be applied from the high voltage power source 1140, a high purity graphite 1142-1 is previously disposed as the target. Similarly as in the case of the glow discharge method, $CHF_3$/Ar gas is introduced from the gas bomb 1105 into the deposition chamber 1101 at a desired flow rate. By charging the high voltage power source 1140 with opening of the shutter 1142, the target 1142-1 is subjected to sputtering. The operations of heating the substrate 1137 to a desired temperature by the heater 1138 and adjusting internally the deposition chamber 1101 to a desired pressure by controlling the opening of the main valve 1134 are the same as in the case of the glow discharge method.

In the case of forming a-C:(X,H) according to the sputtering method, for distributing nonuniformly halogen atoms and/or hydrogen atoms in the layer thickness direction, the same method as in the glow discharge method may be employed. That is, similarly as in the case of the glow discharge method, the operation of changing the openings of the outflow valve 1120 may be performed to change the flow rate of $CHF_3$/Ar gas with lapse of time following the change rate curve previously designed, thereby changing the content of F atoms and/or H atoms in the resistance layer 4 in the film thickness direction.

In the case of the thermal recording head as shown in FIG. 1 and FIG. 2, formation of the heat-generating resistance layer on the substrate by the glow discharge method or the sputtering method as described above is effected substantially all over the surface of the substrate, and thereafter formation of an electroconductive layer and etching of said electroconductive layer and the heat-generating resistance layer by use of photolithography can be performed to obtain a thermal recording head having a plurality of dot-shaped effective heat-generating portions as shown in FIG. 1.

On the other hand, in the case of a thermal recording head as shown in FIG. 3, after an electroconductive layer is previously formed on the substrate and etching of said electroconductive layer is effected by use of photolithography, formation of a heat-generating resistance layer is performed on the substrate according to the glow discharge method or the sputtering method as described above.

For incorporating halogen atoms, hydrogen atoms and silicon atoms, in the case of employing a device as shown in FIG. 5, for example, 1102 is hermetically filled with $CF_4$ gas (purity: 99.9% or higher) diluted with Ar gas, 1103 with $C_2F_6$ gas (purity: 99.9% or higher) diluted with Ar gas, 1104 with $SiH_4$ gas (purity: 99.9% or higher) diluted with Ar gas, 1105 with $Si_2H_6$ gas (purity: 99.9% or higher) diluted with Ar gas, and the desired gases may be introduced into the deposition chamber 1101 by opening the valves of the gas pipelines connected to the bombs for the gases to be introduced.

And, also in the case of forming a-C:Si:(X,H) according to the glow discharge method or the sputtering method, it can be formed by carrying out the operations as described above. For distributing nonuniformly the atoms selected from halogen atoms, hydrogen atoms and silicon atoms, it can also be accomplished similarly as described above by, for example, changing as desired the amounts of the starting gases introduced.

For incorporating halogen atoms, hydrogen atoms and germanium atoms, in the case of employing a device as shown in FIG. 5, for example, 1102 is hermetically filled with $CF_4$ gas (purity: 99.9% or higher) diluted with Ar gas, 1103 with $C_2F_6$ gas (purity: 99.9% or higher) diluted with Ar gas, 1104 with $GeH_4$ gas (purity: 99.9% or higher) diluted with Ar gas, 1105 with $GeH_4$ gas (purity: 99.9% or higher) diluted with Ar gas, and the desired gases may be introduced into the deposition chamber 1101 by opening the valves of the gas pipelines connected to the bombs for the gases to be introduced.

And, also in the case of forming a-C:Ge:(X,H) according to the glow discharge method or the sputtering method, it can be formed by carrying out the operations as described above. For distributing nonuniformly the atoms selected form halogen atoms, hydrogen atoms and germanium atoms, it can also be accomplished similarly as described above by, for example, changing as desired the amounts of the starting gases introduced.

For incorporating halogen atoms, hydrogen atoms, silicon atoms and germanium atoms, in the case of employing a device as shown in FIG. 5, for example, 1102 is hermetically filled with $CH_4$ gas (purity: 99.9% or higher) diluted with Ar gas, 1103 with $SiH_4$ gas (purity: 99.9% or higher) diluted with Ar gas, 1104 with $GeF_4$ gas (purity: 99.9% or higher), 1105 with $SiF_4$ gas (purity: 99.9% or higher) diluted with Ar gas and 1106 with $GeH_4$ gas (purity: 99.9% or higher) diluted with Ar gas, and the desired gases may be introduced into the deposition chamber 1101 by opening the valves of the gas pipelines connected to the bombs for the gases to be introduced.

And, also in the case of forming a-C:Si:Ge:(X,H) according to the glow discharge method or the sputtering method, it can be formed by carrying out the operations as described above. For distributing nonuniformly the atoms selected from halogen atoms, hydrogen atoms, silicon atoms and germanium atoms, it can also be accomplished similarly as described above by, for example, changing as desired the amounts of the starting gases introduced.

For incorporating a substance for controlling electroconductivity in the heat-generating resistance layer, a gas for supplying a substance for controlling electroconductivity may be introduced as the starting gas during formation of the heat-generating resistance layer containing respective desired atoms by use of the glow discharge method or the sputtering method as described above. In the following, a schematic explanation of the case of forming a-C:(X,H)(p,n) is given, by referring to the device shown in FIG. 5 similarly as above.

For example, 1102 is hermetically filled with $CF_4$ gas (purity: 99.9% or higher) diluted with Ar gas, the bomb 1103 hermetically filled with $PH_3$ gas (purity: 99.9% or higher) diluted with Ar gas and 1104 hermetically filled with $B_2H_6$ gas (purity: 99.9% or higher) diluted with Ar gas. Prior to inflow of the gases in these bombs into the deposition chamber 1101, while confirming that the valves 1122 to 1126 for the respective bombs 1102 to 1106 and the leak valve 1135 are closed, and also confirming that the inflow valves 1112 to 1116, the outflow valves 1117 to 1121 and the auxiliary valve 1132 are opened, at first the main valve 1134 is opened to evacuate internally the deposition chamber 1101 and the gas pipelines. Next, when the reading on the vacuum gauge 1136 becomes about $1.5\times10^{-6}$ Torr, the auxiliary valve 1132, the inflow valves 1112 to 1116 and the outflow valves 1117 to 1121 are closed. Then, the valves of the gas pipelines connected to the bomb of the gas to be introduced into the deposition chamber 1101 is opened to introduce the desired gas into the deposition chamber 1101.

Next, an example of the procedure for preparing the resistance layer of the thermal recording head of the present invention according to the glow discharge method by use of the above device is described. By opening the valve 1122, $CF_4$/Ar gas is permitted to flow out from the gas bomb 1102 and $PH_3$/Ar gas to flow out from the gas bomb 1103 by opening the valve 1123, and then with adjustment of the outlet pressure gauges 1127 and 1128 to 1 Kg/$cm^2$, to flow into the mass flow controllers 1107 and 1108 by opening gradually the inflow valves 1112 and 1113. Subsequently, by opening gradually the outflow valves 1117 and 1118 and the auxiliary valve 1132, $CF_4$/Ar gas and $PH_3$/Ar gas are introduced into the deposition chamber 1101. During this operation, the mass flow controllers 1107 and 1108 are adjusted so that the ratio of the flow rate of $CF_4$/Ar gas to the flow rate of $PH_3$/Ar gas may become desired value, and also the opening of the main valve 1134 is adjusted while watching the reading on the vacuum gauge 1136 so that the pressure in the deposition chamber 1101 may become a desired value. And, after the substrate 1137 supported by the supporting member 1139 in the deposition chamber 1101 is heated by the heater 1138 to a desired temperature, the shutter 1142 is opened and glow discharging is excited in the deposition chamber 1101.

Also, in the case of distributing nonuniformly the substance selected from halogen atoms, hydrogen atoms and a substance for controlling electroconductivity in the layer thickness direction in formation of a-C:(X,H) (p,n) by the glow discharge method, various methods as described above may be used. More specifically, the operations of changing the openings of the inflow valves 1117 and 1118 may be performed manually or by means of an externally driven motor, etc. to change the flow rate of $CF_4$/Ar gas and/or the flow rate of $PH_3$/Ar gas with lapse of time following the change rate curve previously designed, thereby changing the content of F atoms, H atoms or the substance for controlling electroconductivity in the resistance layer 4 in the film thickness direction.

Next, an example of the procedure when preparing the resistor of the present invention according to the sputtering method by use of the above device is described. On the electrode 1141 on which high voltage is to be applied from the high voltage power source 1140, a high purity graphite 1142-1 is previously disposed as the target. Similarly as in the case of the glow discharge method, $CF_4$/Ar gas is introduced from the gas bomb 1102 and $PH_3$/Ar gas form the gas bomb 1103 into the deposition chamber 1101 at the respective desired flow rates. By charging the high voltage power source 1140 with opening of the shutter 1142, the target 1142-1 is subjected to sputtering. The operations of heating the substrate 1137 to a desired temperature by the heater 1138 and adjusting internally the deposition chamber 1101 to a desired pressure by controlling the opening of the main valve 1134 are the same as in the case of the glow discharge method. Also, for distributing nonuniformly the substance selected from halogen atoms, hydrogen atoms and a substance for controlling electroconductivity in the layer thickness direction in formation of a-C:(X,H)(p,n) by the sputtering method, various methods as described above can be used. That is, the operations of changing the openings of the outflow valves 1117 and 1118 may be performed similarly as in the case of the above glow discharge method to change the flow rate of $CF_4$/Ar gas and/or the flow rate of $PH_3$/Ar gas with lapse of time following the change rate curve previously designed, thereby changing the content of F atoms, H atoms or the substance for controlling electroconductivity in the resistance layer 4 in the film thickness direction.

Operations similar to those as described for a-C:(X,H)(p,n) are also applicable for formation of a-C:Si:(X,H)(p,n), a-C:Ge:(X,H)(p,n) and a-C:Si:-Ge:(X,H) (p,n), and therefore detailed description about them is omitted here.

In the case of the thermal recording head as shown in FIG. 1 and FIG. 2, formation of the heat-generating resistance layer on the substrate by the glow discharge method or the sputtering method as described above is effected substantially all over the surface of the substrate, and thereafter formation of an electroconductive layer and etching of said electroconductive layer and the heat-generating resistance layer by use of photolithography can be performed to obtain a thermal recording head having a plurality of dot-shaped effective heat-generating portions as shown in FIG. 1.

On the other hand, in the case of a thermal recording head as shown in FIG. 3, after an electroconductive layer is previously formed on the substrate and etching of said electroconductive layer is effected by use of photolithography, formation of a heat-generating resistance layer is performed on the substrate according to the glow discharge method or the sputtering method as described above.

According to the present invention as described above, by use of an amorphous material containing halogen atoms and hydrogen atoms in a matrix of carbon atoms as the heat-generating resistance layer, there is provided a thermal recording head which is markedly good in thermal response, thermal conductivity, heat resistance and/or durability. Also, the heat-generating resistance layer of the thermal recording head of the present invention can be formed with ease. Particularly, according to the present invention, there is provided a thermal recording head having a heat-generating resistance layer which is good in abrasion resistance and/or small in coefficient of friction.

Also, by use of an amorphous material containing silicon atoms, halogen atoms and hydrogen atoms in a matrix of carbon atoms as the heat-generating resistance layer, there is provided a thermal recording head which is further markedly good in mechanical strength.

Alternatively, by use of an amorphous material containing germanium atoms, halogen atoms and hydrogen atoms in a matrix of carbon atoms as the heat-generating resistance layer, there is provided a thermal recording head which is further markedly good in flexibility.

Alternatively, by use of an amorphous material containing silicon atoms, germanium atoms, halogen atoms and hydrogen atoms in a matrix of carbon atoms as the heat-generating resistance layer, there is provided a thermal recording head which is further markedly good in chemical resistance and flexibility.

Further, by incorporating a substance for controlling electroconductivity in the heat-generating resistance layer, there is provided a thermal recording head which is further markedly good in controllability of resistance value.

Further, according to the present invention, by making the content of the substance selected from silicon, atoms, halogen atoms and hydrogen atoms distributed non-uniformly in the film thickness direction in the heat-generating resistance layer, various characteristics such as heat accumulation, heat dissipation, adhesiveness of the substrate with the functional thin film, etc. can be realized with ease.

The present invention is described more in detail below by referring to the Examples, by which the present invention is not limited.

EXAMPLE 1

By use of a support comprising an alumina ceramic plate provided with a glaze layer as the substrate, a heat-generating resistance layer was formed on the surface of said substrate. Deposition of the heat-generating resistance layer was carried out according to the glow discharge method by use of a device shown in FIG. 5. As the starting gas, $CF_4/Ar = 0.5$ (volume ratio) and $H_2$ were employed. The conditions during deposition are as shown in Table 1. During deposition, the degrees of opening of the respective valves and other conditions were maintained constant, and the heat-generating resistance layer with a thickness shown in Table 1 was formed.

After an aluminum layer was formed on the resistance layer formed according to the electron beam vapor deposition method, said aluminum layer was etched to a desired shape by photolithographic technique to form plural pairs of electrodes.

Subsequently, the resistance layer at a predetermined portion was removed by use of a HF type etchant according to photolithographic technique. In this Example, the size of the resistance layer lying between the above electrode pair was 200 $\mu m \times 300$ $\mu m$. In this Example, a plural number of heat-generating resistance devices were prepared on the substrate so that seven heat-generating elements formed between the electrode pairs were arranged longitudinally.

Electric resistance of each heat-generating resistance device of the thermal head thus obtained was measured to be 85 ohm.

Also, durability of said heat-generating resistance device was measured by inputting electrical pulse signals into the respective heat-generating resistance devices of the thermal head obtained according to this Example. For the electrical pulse signal, its duty was made 50%, application voltage 6 V and the driving frequencies 0.5 KHz, 1.0 KHz and 2.0 KHz.

As a result, the heat-generating resistance device was not destroyed even when the number of electrical pulse signal inputting reached $1 \times 10^{10}$ times in every case of driving at different driving frequencies, and its resistance value was substantially unchanged.

Next, by use of a heat-sensitive recording paper, printing of letters with a constitution of lateral 5 dots $\times$ longitudinal 7 dots was performed. As a result even after printing of $2 \times 10^9$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after the printing of 30,000,000 letters.

EXAMPLE 2

A heat-generating resistance layer with the same thickness was deposited in the same manner as in Example 1 except for changing the starting gases to $C_2F_6/Ar=0.2$ (volume ratio) and $H_2$, and the discharging power to 1.5 W/cm$^2$.

Next, when a thermal head was prepared and electrical pulse signal was inputted therein in the same manner as in Example 1, the heat-generating resistance device was not destroyed even when the number of electrical pulse signal inputting reached $1 \times 10^{10}$ times. Also, no change in resistance value was recognized.

Next, when printing was performed on a heat-sensitive paper in the same manner as in Example 1, further printing was performed as the thermal transfer type, and further printing was performed on the typing paper, it was confirmed that the thermal head had satisfactory durability similarly as in Example 1.

EXAMPLE 3

By use of a support comprising an alumina ceramic plate provided with a glaze layer as the substrate, a heat-generating resistance layer was formed on the surface of said substrate. Deposition of the heat-generating resistance layer was carried out according to the sputtering method by use of a device shown in FIG. 5. As the target for sputtering, a graphite with a purity of 99.9% or higher was employed and as the starting gas, $CHF_3/Ar=0.1$ (volume ratio) was employed. The conditions during deposition are as shown in Table 1. During deposition, the degrees of opening of the respective valves and other conditions were maintained constant, and the heat-generating resistance layer with a thickness shown in Table 1 was formed.

When a thermal head was prepared in the same manner as in Example 1 by use of the thus prepared resistance layer, and further printing was performed by inputting electrical pulse signals into the heat-generating resistance device of said thermal head in the same manner as in Example 1, it was confirmed to be excellent in durability similarly as in Example 1.

TABLE 1

| Example No. | Starting Material | Gas Flow Rate (SCCM) | Discharging Power (W/cm$^2$) | Substrate Temperature (°C.) | Film Thickness (Å) |
|---|---|---|---|---|---|
| 1 | $CF_4/Ar = 0.5$ | 50 | 0.8 | 350 | 1000 |
| | $H_2$ | 1 | | | |
| 2 | $C_2F_6/Ar = 0.2$ | 50 | 1.5 | 350 | 1000 |
| | $H_2$ | 1 | | | |
| 3 | $CHF_3/Ar = 0.1$ | 20 | 5 | 350 | 1000 |

EXAMPLE 4

The conditions as shown in Table 2 were employed during deposition, and a heat-generating resistance layer with the thickness as shown in Table 2 was formed while changing the flow rate of $H_2$ gas by changing continuously the opening of the valve during deposition, following otherwise the same procedure as in Example 1, and a heat-generating resistance device was prepared in the same manner as in Example 1 by use of said resistance layer.

Electric resistance of each heat-generating resistance device of the thermal head thus obtained was measured to be 90 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1 \times 10^{10}$ times in every case of driving at different driving frequencies, and its resistance value was substantially unchanged.

Next, by use of a heat-sensitive recording paper, printing of letters with a constitution of lateral 5 dots $\times$ longitudinal 7 dots was performed. As a result even after printing of $2 \times 10^9$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after printing of 30,000,000 letters.

EXAMPLE 5

A heat-generating resistance layer with the same thickness was in the same manner as Example 4 except for changing the starting gases to $C_2F_6/Ar=0.5$ (volume ratio) and $H_2$, and the discharging power to 1.5 $W/cm^2$.

Next, when a thermal head was prepared and electrical pulse signal was inputted therein in the same manner as in Example 4, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 4, further printing was performed as the thermal transfer type, and further printing was performed on the typing paper, it was confirmed that the thermal head had satisfactory durability similarly as in Example 4.

EXAMPLE 6

The conditions as shown in Table 2 were employed during deposition, and the flow rate of $CHF_3/Ar$ gas during deposition was changed by changing continuously the opening of the valve, following otherwise the same procedure as Example 3, to obtain a heat-generating resistance layer with the thickness shown in Table 2.

When a thermal head was prepared in the same manner as in Example 1 by use of the thus prepared resistance layer, and further printing was performed by inputting electrical pulse signals into the heat-generating resistance device of said thermal head in the same manner as in Example 1, it was confirmed to be excellent in durability similarly as in Example 4.

formed, following otherwise the same procedure as Example 1, and a heat-generating resistance device was prepared in the same manner as in Example 1 by use of said resistance layer.

Electric resistance of each heat-generating resistance device of the thermal head thus obtained was measured to be 80 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constitution of lateral 5 dots$\times$longitudinal 7 dots was performed. As a result even after printing of $2\times10^9$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after the printing of 30,000,000 letters.

EXAMPLE 8

A heat-generating resistance layer with the same thickness was deposited in the same manner as in Example 7 except for changing the starting gases to $CF_4/Ar=0.5$ (volume ratio) and $B_2H_6/Ar=1000$ ppm (volume ratio).

Next, when a thermal head was prepared and electrical pulse signal was inputted therein in the same manner as in Example 7, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 7, further printing was performed as the thermal transfer type, and further printing was performed on the typing paper, it was confirmed that the thermal head had satisfactory durability similarly as in Example 7.

TABLE 2

| Example No. | Starting Material | Gas Flow Rate (SCCM) | Discharging Power ($W/cm^2$) | Substrate Temperature (°C.) | Film Thickness (Å) |
|---|---|---|---|---|---|
| 4 | $CF_4/Ar = 0.5$ | 50 | 0.8 | 350 | 1000 |
| | $H_2$ | 2→1 | | | |
| 5 | $C_2F_6/Ar = 0.5$ | 50 | 1.5 | 350 | 1000 |
| | $H_2$ | 2→1 | | | |
| 6 | $CHF_3/Ar = 0.1$ | 20→10 | 5 | 350 | 1000 |

EXAMPLE 7

As the starting gases, $CF_4/Ar=0.5$ (volume ratio) and $PH_3/Ar=1000$ ppm (volume ratio) were employed, and the conditions as shown in Table 3 were employed during deposition. A heat-generating resistance layer with the thickness as shown in Table 3 was

TABLE 3

| Example No. | Starting Material | Gas Flow Rate (SCCM) | Discharging Power ($W/cm^2$) | Substrate Temperature (°C.) | Film Thickness (Å) |
|---|---|---|---|---|---|
| 7 | $CF_4/Ar$ = 0.5 | 50 | 1.5 | 350 | 1000 |
| | $PH_3/Ar$ = 1000 ppm | 125 | | | |
| 8 | $CF_4/Ar$ = 0.5 | 50 | 1.5 | 350 | 1000 |
| | $B_2H_6/Ar$ = 1000 ppm | 125 | | | |

EXAMPLE 9

The conditions as shown in Table 4 were employed during deposition, and a heat-generating resistance layer with the thickness as shown in Table 4 was formed while changing the flow rate of $CF_4/Ar$ gas by changing continuously the opening of the valve during deposition, following otherwise the same procedure as in Example 7, and a heat-generating resistance device was prepared by use of said resistance layer.

Electric resistance of each heat-generating resistance device of the thermal head thus obtained was measured to be 85 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constitution of lateral 5 dots$\times$longitudinal 7 dots was performed. As a result even after printing of $2\times10^9$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after the printing of 30,000,000 letters.

EXAMPLE 10

A heat-generating resistance with the same thickness was deposited in the same manner as in Example 9 except for changing the starting gases to $CF_4/Ar=0.5$ (volume ratio) and $B_2H_6/Ar=1000$ ppm (volume ratio).

Next, when a thermal head was prepared and electrical pulse signal was inputted therein in the same manner as in Example 9, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 9, further printing was performed as the thermal transfer type, and further printing was performed on the typing paper, it was confirmed that the thermal head had satisfactory durability similarly as in Example 9.

EXAMPLE 11

A heat-generating resistance layer with the same thickness was deposited in the same manner as in Example 9 except for maintaining the flow rate of $CF_4/Ar$ gas constant and changing continuously the discharging power.

Next, when a thermal head was prepared and electrical pulse signal was inputted therein in the same manner as in Example 9, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 9, further printing was performed as the thermal transfer type, and further printing was performed on the typing paper, it was confirmed that the thermal head had satisfactory durability similarly as in Example 9.

EXAMPLE 12

A heat-generating resistance layer with the same thickness was deposited in the same manner as in Example 10 except for maintaining the flow rate of $CF_4/Ar$ gas constant and changing continuously the discharging power.

Next, when a thermal head was prepared and electrical pulse signal was inputted therein in the same manner as in Example 10, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 10, further printing was performed as the thermal transfer type, and further printing was performed on the typing paper, it was confirmed that the thermal head had satisfactory durability similarly as in Example 10.

TABLE 4

| Example No. | Starting Material | Gas Flow Rate (SCCM) | Discharging Power ($W/cm^2$) | Substrate Temperature (°C.) | Film Thickness (Å) |
|---|---|---|---|---|---|
| 9 | $CF_4/Ar$ = 0.5 | 50→30 | 1.5 | 350 | 1000 |
| | $PH_3/Ar$ = 1000 ppm | 125 | | | |
| 10 | $CF_4/Ar$ = 0.5 | 50→30 | 1.5 | 350 | 1000 |
| | $B_2H_6/Ar$ = 1000 ppm | 125 | | | |
| 11 | $CF_4/Ar$ = 0.5 | 50 | 1.5→1.6 | 350 | 1000 |

TABLE 4-continued

| Example No. | Starting Material | Gas Flow Rate (SCCM) | Discharging Power (W/cm$^2$) | Substrate Temperature (°C.) | Film Thickness (Å) |
|---|---|---|---|---|---|
| | $PH_3/Ar$ = 1000 ppm | 125 | | | |
| 12 | $CF_4/Ar$ = 0.5 | 50 | 1.5→1.6 | 350 | 1000 |
| | $B_2H_6/Ar$ = 1000 ppm | 125 | | | |

EXAMPLE 13

As the starting gases, $CF_4/Ar=0.5$ (volume ratio) and $SiH_4/Ar=0.1$ (volume ratio) were employed, and the conditions as shown in Table 5 were employed during deposition. A heat-generating resistance layer with the thickness as shown in Table 5 was formed, following otherwise the same procedure as in Example 1, and a heat-generating resistance device was prepared in the same manner as in Example 1 by use of said resistance layer.

Electric resistance of each heat-generating resistance device of the thermal head thus obtained was measured to be 85 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constitution of lateral 5 dots×longitudinal 7 dots was performed. As a result even after printing of $2\times10^9$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after the printing of 30,000,000 letters.

EXAMPLE 14

A heat-generating resistance layer with the same thickness was deposited in the same manner as in Example 13 except for changing the starting gases to $C_2F_6/Ar=0.5$ (volume ratio) and $Si_2H_6/Ar=0.1$ (volume ratio).

Next, when a thermal head was prepared and electrical pulse signal was inputted therein in the same manner as in Example 13, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 13, further printing was performed as the thermal transfer type, and further printing was performed on the typing paper, it was confirmed that the thermal head had satisfactory durability similarly as in Example 13.

EXAMPLE 15

As the starting gases, $CF_4/Ar=0.5$ (volume ratio) and $SiH_4/Ar=0.1$ (volume ratio) were employed, and the conditions as shown in Table 5 were employed during deposition, following otherwise the same procedure as in Example 3, to obtain a heat-generating resistance layer with the thickness shown in Table 5.

When a thermal head was prepared in the same manner as in Example 13 by use of the thus prepared resistance layer, and further printing was performed by inputting electrical pulse signals into the heat-generating resistance device of said thermal head in the same manner as in Example 13, it was confirmed to be excellent in durability similarly as in Example 13.

TABLE 5

| Example No. | Starting Material | Gas Flow Rate (SCCM) | Discharging Power (W/cm$^2$) | Substrate Temperature (°C.) | Film Thickness (Å) |
|---|---|---|---|---|---|
| 13 | $CF_4/Ar$ = 0.5 | 50 | 0.8 | 350 | 1000 |
| | $SiH_4/Ar$ = 0.1 | 5 | | | |
| 14 | $C_2F_6/Ar$ = 0.5 | 50 | 0.8 | 350 | 1000 |
| | $Si_2H_6/Ar$ = 0.1 | 2 | | | |
| 15 | $CF_4/Ar$ = 0.5 | 15 | 5 | 350 | 1000 |
| | $SiH_4/Ar$ = 0.1 | 2 | | | |

EXAMPLE 16

The conditions as shown in Table 6 were employed during deposition, and a heat-generating resistance layer with the thickness as shown in Table 6 was formed while changing the flow rate of $SiH_4/Ar$ gas by changing continuously the opening of the valve during deposition, following otherwise the same procedure as in Example 13, and a heat-generating resistance device was prepared by use of said resistance layer.

Electric resistance of each heat-generating resistance device of the thermal head thus obtained was measured to be 90 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constitution of lateral 5 dots$\times$longitudinal 7 dots was performed. As a result even after printing of $2\times10^{9}$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after the printing of 30,000,000 letters.

EXAMPLE 17

A heat-generating resistance layer with the same thickness was deposited in the same manner as in Example 16 except for maintaining the flow rate of $SiH_4/Ar$ gas constant and changing continuously the discharging power.

Next, when a thermal head was prepared and an electrical pulse signal was inputted therein in the same manner as in Example 16, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 16, further printing was performed as the thermal transfer type, and further printing was performed on the typing paper, it was confirmed that the thermal head had satisfactory durability similarly as in Example 16.

TABLE 6

| Example No. | Starting Material | Gas Flow Rate (SCCM) | Discharging Power (W/cm²) | Substrate Temperature (°C.) | Film Thickness (Å) |
|---|---|---|---|---|---|
| 16 | $CF_4/Ar = 0.5$ | 50 | 0.8 | 350 | 1000 |
| | $SiH_4/Ar = 0.8$ | 5→2 | | | |
| 17 | $CF_4/Ar = 0.5$ | 50 | 0.8→0.9 | 350 | 1000 |
| | $SiH_4/Ar = 0.8$ | 5 | | | |

EXAMPLE 18

As the starting gases, $CF_4/Ar=0.5$ (volume ratio) and $GeH_4/Ar=0.1$ (volume ratio) were employed, and the conditions as shown in Table 7 were employed during deposition. A heat-generating resistance layer with the thickness as shown in Table 7 was formed, following otherwise the same procedure as in Example 1, and a heat-generating resistance device was prepared in the same manner as in Example 1 by use of said resistance layer.

Electric resistance of each heat-generating resistance device of the thermal head thus obtained was measured to be 85 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constituting of lateral 5 dots$\times$longitudinal 7 dots was performed. As a result even after printing of $2\times10^{9}$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after the printing of 30,000,000 letters.

EXAMPLE 19

A heat-generating resistance layer with the same thickness was deposited in the same manner as in Example 18 except for changing the starting gases to $C_2F_6/Ar=0.5$ (volume ratio) and $GeH_4/Ar=0.1$ (volume ratio).

Next, when a thermal head was prepared and electrical pulse signal was inputted therein in the same manner as in Example 18, the heat-generating resistance device was not destroyed even when the number of electrical pulse signal inputting reached $1\times10^{10}$ times. Also, no change in resistance value was recognized.

Next, when printing was performed on a heat-sensitive paper in the same manner as in Example 18, further printing was performed as the thermal transfer type, and further printing was performed on the typing paper, it was confirmed that the thermal head had satisfactory durability similarly as in Example 18.

TABLE 7

| Example No. | Starting Material | Gas Flow Rate (SCCM) | Discharging Power ($W/cm^2$) | Substrate Temperature (°C.) | Film Thickness (Å) |
|---|---|---|---|---|---|
| 18 | $CF_4/Ar$ = 0.5 | 50 | 0.8 | 350 | 1000 |
| | $GeH_4/Ar$ = 0.1 | 5 | | | |
| 19 | $C_2F_6/Ar$ = 0.5 | 50 | 0.8 | 350 | 1000 |
| | $GeH_4/Ar$ = 0.1 | 5 | | | |

EXAMPLE 20

The conditions as shown in Table 8 were employed during deposition, and a heat-generating resistance layer with the thickness as shown in Table 8 was formed while changing the flow rate of $GeH_4/Ar$ gas by changing continuously the opening of the value during deposition, following otherwise the same procedure as in Example 18.

Electric resistance of each heat-generating resistance device of the thermal head thus obtained was measured to be 90 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constitution of lateral 5 dots×longitudinal 7 dots was performed. As a result even after printing of $2\times10^9$ letters, no inconvenience such as dot defect occured in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after, printing the of 30,000,000 letters.

EXAMPLE 21

A heat-generating resistance layer with the same thickness was deposited in the same manner as in Example 20 except for changing the starting gases to $C_2F_6/Ar=0.5$ (volume ratio) and $GeH_4/Ar=0.1$ (volume ratio).

Next, when a thermal head was prepared and electrical pulse signal was inputted therein in the same manner as in Example 20, the heat-generating resistance device was not destroyed even when the number of electrical pulse signals inputting reached $1\times10^{10}$. Also, no change in resistance value was recognized.

Next, when printing was performed on a heat-sensitive paper in the same manner as in Example 20, further printing was performed as the thermal transfer type, and further printing was performed on the typing paper, it was confirmed that the thermal head had satisfactory durability similarly as in Example 20.

EXAMPLE 22

A heat-generating resistance layer with the same thickness was deposited in the same manner as Example 20 except for maintaining the flow rate of $GeH_4/Ar$ gas constant and changing continuously the discharging power.

Next, when a thermal head was prepared and electrical pulse signal was inputted therein in the same manner as in Example 20, the heat-generating resistance device was not destroyed even when the number of electrical pulse signals inputted reached $1\times10^{10}$. Also, no change in resistance value was recognized.

Next, when printing was performed on a heat-sensitive paper in the same manner as in Example 20, further printing was performed as the thermal transfer type, and further printing was performed on the typing paper, it was confirmed that the thermal head had satisfactory durability similarly as in Example 20.

EXAMPLE 23

A heat-generating resistance layer with the same thickness was deposited in the same manner as in Example 21 except for maintaining the flow rate of $GeH_4/Ar$ gas constant and changing continuously the discharging power.

Next, when a thermal head was prepared and electrical pulse signal was inputted therein in the same manner as in Example 21, the heat-generating resistance device was not destroyed even when the number of electrical pulse signals inputting reached $1\times10^{10}$. Also, no change in resistance value was recognized.

Next, when printing was performed on a heat-sensitive paper in the same manner as in Example 21, further printing was performed as the thermal transfer type, and further printing was performed on the typing paper, it was confirmed that the thermal head had satisfactory durability similarly as in Example 21.

TABLE 8

| Example No. | Starting Material | Gas Flow Rate (SCCM) | Discharging Power ($W/cm^2$) | Substrate Temperature (°C.) | Film Thickness (Å) |
|---|---|---|---|---|---|
| 20 | $CF_4/Ar$ = 0.5 | 50 | 0.8 | 350 | 1000 |
| | $GeH_4/Ar$ = 0.1 | 5→2 | | | |
| 21 | $C_2F_6/Ar$ = 0.5 | 50 | 0.8 | 350 | 1000 |
| | $GeH_4/Ar$ = 0.1 | 5→2 | | | |
| 22 | $CF_4/Ar$ = 0.5 | 50 | 0.8→0.9 | 350 | 1000 |

TABLE 8-continued

| Example No. | Starting Material | Gas Flow Rate (SCCM) | Discharging Power ($W/cm^2$) | Substrate Temperature (°C.) | Film Thickness (Å) |
|---|---|---|---|---|---|
| | $GeH_4/Ar = 0.1$ | 5 | | | |
| 23 | $C_2F_6/Ar = 0.5$ | 50 | 0.8→0.9 | 350 | 1000 |
| | $GeH_4/Ar = 0.1$ | 5 | | | |

EXAMPLE 24

As the starting gases, $CH_4/Ar=0.5$ (volume ratio), $SiH_4/Ar=0.1$ (volume ratio) and $GeF_4/Ar=0.05$ (volume ratio) were employed, and the conditions as shown in Table 9 were employed during deposition. A heat-generating resistance layer with the thickness as shown in Table 9 was formed, following otherwise the same procedure as in Example 1, and a heat-generating resistance device was prepared in the same manner as in Example 1 by use of said resistance layer.

Electric resistance of each heat-generating resistance device of the thermal head thus obtained was measured to be 85 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constitution of lateral 5 dots×longitudinal 7 dots was performed. As a result even after printing of $2\times10^9$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performances as compared with the thermal head of the prior art. That is, as compared with the printing by use of the thermal head of the prior art which gave rise to printing defects after printing of 30,000,000 letters, no printing defects occurred at all in the printing by use of the thermal head of this Example after printing of the 30,000,000 letters.

EXAMPLE 25

A heat-generating resistance layer with the same thickness was deposited in the same manner as in Example 24 except for changing the starting gases to $CH_4/Ar=0.5$ (volume ratio), $SiF_4/Ar=0.1$ (volume ratio) and $GeH_4/Ar=0.05$ (volume ratio).

Next, when a thermal head was prepared and an electrical pulse signal was inputted therein in the same manner as in Example 24, the heat-generating resistance device was not destroyed even when the number of electrical pulse signals inputting reached $1\times10^{10}$. Also, no change in resistance value was recognized.

Next, when printing was performed on a heat-sensitive paper in the same manner as in Example 24, further printing was performed as the thermal transfer type, and further printing was performed on the typing paper, it was confirmed that the thermal head had satisfactory durability similarly as in Example 24.

TABLE 9

| Example No. | Starting Material | Gas Flow Rate (SCCM) | Discharging Power ($W/cm^2$) | Substrate Temperature (°C.) | Film Thickness (Å) |
|---|---|---|---|---|---|
| 24 | $CH_4/Ar = 0.5$ | 50 | 0.8 | 350 | 1000 |
| | $SiH_4/Ar = 0.1$ | 5 | | | |
| | $GeF_4/Ar = 0.05$ | 5 | | | |
| 25 | $CH_4/Ar = 0.5$ | 50 | 0.8 | 350 | 1000 |
| | $SiF_4/Ar = 0.1$ | 5 | | | |
| | $GeH_4/Ar = 0.05$ | 5 | | | |

EXAMPLE 26

The conditions as shown in Table 10 were employed during deposition, and a heat-generating resistance layer with the thickness as shown in Table 10 was formed while changing the flow rate of $SiH_4/Ar$ gas and the flow rate of $GeF_4/Ar$ gas by changing continuously the openings of valves during deposition, following otherwise the same procedure as in Example 24, and a heat-generating resistance device was prepared by use of said resistance layer in the same manner as in Example 1.

Electric resistance of each heat-generating resistance device of the thermal head thus obtained was measured to be 90 ohm.

Also, durability of said heat-generating resistance device was measured by inputting electrical pulse signals into the heat-generating resistance device of the thermal head obtained according to this Example under the same conditions as in Example 1.

As a result, the heat-generating resistance device was not destroyed even when the number of electrical pulse signal inputting reached $1\times10^{10}$ times in every case of driving at different driving frequencies, and its resistance value was substantially unchanged.

Next, by use of a heat-sensitive recording paper, printing of letters with a constitution of lateral 5 dots×longitudinal 7 dots was performed. As a result even after printing of $2\times10^9$ letters, no inconvenience such as dot defect occurred in the letters recorded. Also, when the thermal head of this Example was used as the so called thermal transfer type, in which recording is effected on a recording paper through a heat-sensitive transfer ink ribbon, it was found to have similarly very excellent durability.

Further, when recording was performed by use of the so called typing paper with coarse surface as the recording paper, the thermal head of this Example was found to have excellent durability performance as compared with the thermal head of the prior art. That is, as compared with the printing by use of the thermal head of the prior art which gave rise to printing defects after printing of 30,000,000 letters, no printing defects occurred at all in the printing by use of the thermal head of this Example after printing of 30,000,000 letters.

EXAMPLE 27

A heat-generating resistance layer with the same thickness was deposited in the same manner as in Example 26 except for changing the starting gases to $CH_4/Ar=0.5$ (volume ratio), $SiF_4/Ar=0.1$ (volume ratio) and $GeH_4/Ar=0.05$ (volume ratio).

EXAMPLE 29

A heat-generating resistance layer with the same thickness was deposited in the same manner as in Example 27 except for maintaining the flow rate of $SiF_4/Ar$ gas and the flow rate of $GeH_4/Ar$ gas constant and changing continuously the discharging power.

Next, when a thermal head was prepared and electrical pulse signal was inputted therein in the same manner as in Example 27, the heat-generating resistance device was not destroyed even when the number of electrical pulse signals inputting reached $1\times10^{10}$. Also, no change in resistance value was recognized.

Next, when printing was performed on a heat-sensitive paper in the same manner as Example 27, further printing was performed as the thermal transfer type, and further printing was performed on the typing paper, it was confirmed that the thermal head had satisfactory durability similarly as in Example 27.

TABLE 10

| Example No. | Starting Material | Gas Flow Rate (SCCM) | Discharging Power ($W/cm^2$) | Substrate Temperature (°C.) | Film Thickness (Å) |
|---|---|---|---|---|---|
| 26 | $CH_4/Ar = 0.5$ | 50 | 0.8 | 350 | 1000 |
| | $SiH_4/Ar = 0.1$ | 5→2 | | | |
| | $GeF_4/Ar = 0.05$ | 5→2 | | | |
| 27 | $CH_4/Ar = 0.5$ | 50 | 0.8 | 350 | 1000 |
| | $SiF_4/Ar = 0.1$ | 5→2 | | | |
| | $GeH_4/Ar = 0.05$ | 5→2 | | | |
| 28 | $CH_4/Ar = 0.5$ | 50 | 0.8→0.9 | 350 | 1000 |
| | $SiH_4/Ar = 0.1$ | 5 | | | |
| | $GeF_4/Ar = 0.05$ | 5 | | | |
| 29 | $CH_4/Ar = 0.5$ | 50 | 0.8→0.9 | 350 | 1000 |
| | $SiF_4/Ar = 0.1$ | 5 | | | |
| | $GeH_4/Ar = 0.05$ | 5 | | | |

Next, when a thermal head was prepared and electrical pulse signal was inputted therein in the same manner as in Example 26, the heat-generating resistance device was not destroyed even when the number of electrical pulse signals inputting reached $1\times10^{10}$. Also, no change in resistance value was recognized.

Next, when printing was performed on a heat-sensitive paper in the same manner as in Example 26, further printing was performed as the thermal transfer type, and further printing was performed on the typing paper, it was confirmed that the thermal head had satisfactory durability similarly as in Example 26.

EXAMPLE 28

A heat-generating resistance layer with the same thickness was deposited in the same manner as in Example 26 except for maintaining the flow rate of $SiH_4/Ar$ gas and the flow rate of $GeF_4/Ar$ gas constant and changing continuously the discharging power.

Next, when a thermal head was prepared and electrical pulse signal was inputted therein in the same manner as in Example 26, the heat-generating resistance device was not destroyed even when the number of electrical pulse signals inputting reached $1\times10^{10}$ . Also, no change in resistance value was recognized.

Next, when printing was performed on a heat-sensitive paper in the same manner as in Example 26, further printing was performed as the thermal transfer type, and further printing was performed on the typing paper, it was confirmed that the thermal head had satisfactory durability similarly as in Example 26.

We claim:

1. A thermal recording head comprising a substrate and at least one set of a heat-generating resistance layer and at least one pair of electrodes connected to said heat-generating resistance layer, said set being formed on said substrate, wherein said heat-generating resistance layer comprises an amorphous material containing halogen atoms and hydrogen atoms in a matrix of carbon atoms, wherein at least one of halogen atoms and hydrogen atoms are distributed nonuniformly everywhere throughout the film thickness direction in said amorphous material.

2. A thermal recording head according to claim 1, wherein said amorphous material further contains silicon atoms.

3. A thermal recording head according to claim 1, wherein said amorphous material further contains germanium atoms.

4. A thermal recording head according to claim 1, wherein said amorphous material further contains a substance for controlling electroconductivity.

5. A thermal recording head according to claim 2, wherein said amorphous material further contains germanium atoms.

6. A thermal recording head according to claim 2, wherein said from silicon atoms are distributed nonuniformly in the film thickness direction in said amorphous material.

7. A thermal recording head according to claim 3, wherein said germanium atoms are distributed nonuniformly in the film thickness direction in said amorphous material.

8. A thermal recording head according to claim 4, wherein said substance for controlling electroconductivity is distributed nonuniformly in the film thickness direction and in said amorphous material.

9. A thermal recording head according to claim 5, wherein said germanium atoms are distributed nonuniformly in the film thickness in said amorphous material.

10. A thermal recording head according to claim 2, wherein said amorphous material further contains a substance for controlling electroconductivity.

11. A thermal recording head according to claim 3, wherein said amorphous material further contains a substance for controlling electroconductivity.

12. A thermal recording head according to claim 5, wherein said amorphous material further contains a substance for controlling electroconductivity.

13. A thermal recording head according to any one of claims, 1–5 and 6–12, wherein the content of halogen atoms in the amorphous material is 0.0001 to 30 atomic %.

14. A thermal recording head according to any one of claims 1–5 and 6–12, wherein the content of hydrogen atoms in the amorphous material is 0.0001 to 30 atomic %.

15. A thermal recording head according to any one of claims, 1–5 and 6–12, wherein the sum of the content of halogen atoms and the content of hydrogen atoms in the amorphous material is 0.0001 to 40 atomic %.

16. A thermal recording head according to any one of claims, 1–5 and 6–12, wherein the halogen atoms are F or Cl.

17. A thermal recording head according to any one of claims 1–5 and 6–12, wherein the substrate has a surface layer comprising an amorphous material of a matrix of carbon atoms on the side on which the heat-generating resistance layer is formed.

18. A thermal recording head according to any one of claims 2, 5, 6, 9, 10 and 12, wherein the content of silicon atoms in the amorphous material is 0.0001 to 40 atomic %.

19. A thermal recording head according to any one of claims 2, 6 and 10, wherein the sum of the content of silicon atoms, the content of halogen atoms and the content of hydrogen atoms in the amorphous material is 0.0001 to 40 atomic %.

20. A thermal recording head according to any one of claims 3, 5, 7, 9, 11 and 12, wherein the content of germanium atoms in the amorphous material is 0.0001 to 40 atomic %.

21. A thermal recording head according to any one of claims 3, 7 and 11, wherein the sum of the content of germanium atoms, the content of halogen atoms and the content of hydrogen atoms in the amorphous material is 0.0001 to 40 atomic %.

22. A thermal recording head according to any one of claims 4, 8, 10, 11 and 12, wherein the content of the substance for controlling electroconductivity is 0.01 to 50000 atomic ppm in the amorphous material.

23. A thermal recording head according to any one of claims 4, 8, 10, 11 and 12, wherein the substance for controlling electroconductivity is an atom belonging to group III of the periodic table of elements.

24. A thermal recording head according to any one of claims 4, 8, 10, 11 and 12, wherein the substance for controlling electroconductivity is an atom belonging to group V of the periodic table of elements.

25. A thermal recording head according to any one of claims 5, 9 and 12, wherein the sum of the content of silicon atoms, the content of germanium atoms, the content of halogen atoms and the content of hydrogen atoms in the amorphous material 0.0001 to 40 atomic %.

26. A thermal recording head according to claim 10, wherein the silicon atoms, and substances for controlling electroconductivity are distributed nonuniformly in the film thickness direction in said heat-generating resistance layer.

27. A thermal recording head according to claim 11, wherein the germanium atoms, and substances for controlling electroconductivity are distributed nonuniformly in the film thickness direction in said heat-generating resistance layer.

28. A thermal recording head according to claim 12, wherein the substance selected from silicon atoms, germanium atoms, and substances for controlling electroconductivity are distributed nonuniformly in the film thickness direction in said heat-generating resistance layer.

29. A thermal recording head according to any one of claims 26 to 28, wherein the content of halogen atoms in the amorphous material is 0.0001 to 30 atomic %.

30. A thermal recording head according to any one of claims 26 to 28, wherein the content of hydrogen atoms in the amorphous material is 0.0001 to 30 atomic %.

31. A thermal recording head according to any one of claims 26 to 28, wherein the sum of the content of halogen atoms and the content of hydrogen atoms in the amorphous material is 0.0001 to 40 atomic %.

32. A thermal recording head according to any one of claims 26 to 28, wherein the halogen atoms are F or Cl.

33. A thermal recording head according to any one of claims 26 to 28, wherein the substrate has a surface layer comprising an amorphous material of a matrix of carbon atoms on the side on which the heat-generating resistance layer is formed.

34. A thermal recording head according to any one of claims 26 and 28, wherein the content of silicon atoms in the amorphous material is 0.0001 to 40 atomic %.

35. A thermal recording head according to claim 26, wherein the sum of the content of silicon atoms, the content of halogen atoms and the content, of hydrogen atoms in the amorphous material is 0.0001 to 40 atomic %.

36. A thermal recording head according to any one of claims 27 and 28, wherein the content of germanium atoms in the amorphous material is 0.0001 to 40 atomic %.

37. A thermal recording head according to claim 27, wherein the sum of the content of germanium atoms, the content of halogen atoms and the content of hydrogen atoms in the amorphous material is 0.0001 to 40 atomic %.

38. A thermal recording head according to any one of claims 26 to 28, wherein the content of the substance for controlling electroconductivity is 0.01 to 50,000 atomic ppm in the amorphous material.

39. A thermal recording head according to any one of claims 26 to 28, wherein the substance for controlling electroconductivity is an atom belonging to group III of the periodic table of elements.

40. A thermal recording head according to any one of claims 26 to 28, wherein the substance for controlling electroconductivity is an atom belonging to the group V of the periodic table of elements.

41. A thermal recording head according to claim 28, wherein the sum of the content of silicon atoms, the content of germanium atoms, the content of halogen atoms and the content of hydrogen atoms in the amorphous material is 0.0001 to 40 atomic %.

42. A thermal recording head according to any one of claims 6 to 9 and 26 to 28, wherein halogen atoms and/or hydrogen atoms are distributed as enriched on the substrate side.

43. A thermal recording head according to any one of claims 6, 8, 26 and 28, wherein silicon atoms are distributed as enriched on the substrate side.

44. A thermal recording head according to any one of claims 7, 9, 27 and 28, wherein germanium atoms are distributed as enriched on the substrate side.

45. A thermal recording head according to any one of claims 8 and 26 to 28, wherein the substance for controlling electroconductivity is distributed as enriched on the substrate side.

46. A thermal; recording head according to any one of claim 6 to 9 and 26 to 28, wherein halogen atoms and/or hydrogen atoms are distributed as depleted on the substrate side.

47. A thermal recording head according to any one of claims 6, 9, 26 and 28, wherein silicon atoms are distributed as depleted on the substrate side.

48. A thermal recording head according to any one of claims 7, 9, 27 and 28, wherein germanium atoms are distributed as depleted on the substrate side.

49. A thermal recording head according to any one of claims 8 and 26 to 28, wherein the substance for controlling electroconductivity is distributed as depleted on the substrate side.

50. A thermal recording head according to any one of claims 6 to 9 and 26 to 28, wherein halogen atoms and/or hydrogen atoms are distributed as enriched around the center of the layer thickness.

51. A thermal recording head according to any one of claims 6, 9, 26 and 28, wherein silicon atoms are distributed as enriched around the center of the layer thickness.

52. A thermal recording head according to any one of claims 7, 9, 27 and 28, wherein germanium atoms are distributed as enriched around the center of the layer thickness.

53. A thermal recording head according to any one of claims 8 and 26 to 28, wherein the substance for controlling electroconductivity is distributed as enriched around the center of the layer thickness.

* * * * *

UNITED STATES PATENT AND TRADEMARK OFFICE

CERTIFICATE OF CORRECTION

PATENT NO. : 4,983,993

DATED : January 8, 1991

INVENTOR(S) : MASAO SUGATA, ET AL.

It is certified that error appears in the above-identified patent and that said Letters Patent is hereby corrected as shown below: TITLE PAGE:

IN [56] REFERENCES CITED

U.S. PATENT DOCUMENTS, "Tiedeman" should read --Tiedemann--.

FOREIGN PATENT DOCUMENTS, "58-42472 7/1983 Japan" should read --58-42472 3/1983 Japan-- and "58-42473 10/1983 Japan" should read --58-42473 3/1983 Japan--.

COLUMN 1

Line 5, "abandoned" should read --abandoned.--.
Line 61, "to" should be deleted.

COLUMN 4

Line 25, "strenght" should read --strength--.

COLUMN 5

Line 14, "aabbreviated" should read --abbreviated--.
Line 34, ""ai-" should read --"a- --.

COLUMN 6

Line 21, "accumulation" should read --accumulation, heat--.

COLUMN 7

Line 45, "stitued" should read --stituted--.
Line 54, "$BrF_3$, $IF_7$," should read --$BrF_3$, $IF_3$, $IF_7$,-- and "halosubstituted" should read --halo-substituted--.

UNITED STATES PATENT AND TRADEMARK OFFICE
CERTIFICATE OF CORRECTION

PATENT NO. : 4,983,993

DATED : January 8, 1991

INVENTOR(S) : MASAO SUGATA, ET AL.

It is certified that error appears in the above-identified patent and that said Letters Patent is hereby corrected as shown below:

COLUMN 10

Line 17, "gages 1136" should read --gage 1136--.

COLUMN 13

Line 22, "form" should read --from--.

COLUMN 25

Line 16, "value" should read --valve--.

COLUMN 29

Line 61, "inputting" should read --inputted--.

COLUMN 30

Line 12, "inputting" should read --inputted--.
Line 62, "from" should be deleted.

COLUMN 31

Line 18, "claims, 1-5 and 6-12," should read --claims 1 to 12,--.
Line 22, "claims 1-5 and 6-12," should read --claims 1 to 12--.
Line 26, "claims, 1-5 and 6-12," should read --claims 1 to 12--.

UNITED STATES PATENT AND TRADEMARK OFFICE

CERTIFICATE OF CORRECTION

PATENT NO. : 4,983,993

DATED : January 8, 1991

INVENTOR(S) : MASAO SUGATA, ET AL.

It is certified that error appears in the above-identified patent and that said Letters Patent is hereby corrected as shown below:

COLUMN 31

Line 30, "claims, 1-5 and 6-12," should read --claims 1 to 12--.
Line 33, "claims 1-5 and 6-12," should read --claims 1 to 12--.

COLUMN 32

Line 3, "material" should read --material is--.
Line 42, "content," should read --content--.
Line 64, "the" should be deleted.

COLUMN 33

Line 8, "claims 6, 8, 26 and 28," should read --claims 6, 9, 26 and 28,--.
Line 17, "thermal;" should read --thermal--.
Line 18, "claim 6 to 9" should read --claims 6 to 9--.

Signed and Sealed this

Eighth Day of September, 1992

*Attest:*

DOUGLAS B. COMER

*Attesting Officer*

*Acting Commissioner of Patents and Trademarks*